United States Patent Office 3,313,815
Patented Apr. 11, 1967

3,313,815
8 - CHLOROPYRAZOLO-[1,5-c]QUINAZOLINE DERIVATIVES AND METHODS OF PREPARING SAME
Roger T. Wolfe, North Greenbush, and Alexander R. Surrey, Albany, N.Y., assignors to Sterling Drug Inc., New York, N.Y., a corporation of Delaware
No Drawing. Filed May 4, 1964, Ser. No. 364,782
15 Claims. (Cl. 260—256.4)

This invention relates to novel organic heterocyclic compounds and to methods and intermediates for their preparation.

One aspect of the invention relates to 8-chloro-5-R-5,6-dihydropyrazolo[1,5-c]quinazolines having in free base form the structural formula

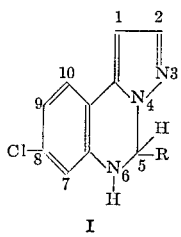

I wherein R is a member of the group consisting of H, phenyl, pyridyl, thienyl, furyl, carboxy, and carbalkoxy.

When R is one of the aryl groups phenyl, pyridyl, thienyl or furyl, it can be unsubstituted, or it can be substituted with up to three substituents. The said substituents can be the same or different and can be located in any of the available ring positions relative to each other. Examples of substituents which can be attached to the aryl groups are lower-alkyl, lower-alkoxy, nitro, halo (i.e., chloro, bromo, iodo and fluoro), hydroxy, mercapto, lower-alkylthio, di-(lower-alkyl)amino, carboxy, lower-alkanesulfonyl, trifluoromethyl, and the like.

When R is carbalkoxy, it is the group —CO—O—R' where R' is a straight- or branched-chain alkyl group of from one to about ten carbon atoms. Thus carbalkoxy includes such groups as carbomethoxy, carbethoxy, carbopropoxy, carboisopropoxy, carbobutoxy, carbopentyloxy, carbohexyloxy, carboheptyloxy, carboöctyloxy, carbononyloxy, carbodecyloxy, carbo-sec-butoxy, and the like.

A further aspect of the invention relates to 8-chloro-5-X(6H)pyrazolo[1,5-c]quinazolines having in free base form the general formula

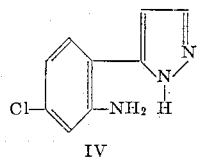

II wherein X is a member of the group consisting of O and S.

Still another aspect of the invention relates to 8-chloropyrazolo[1,5-c]quinazolines having in free base form the structural formula

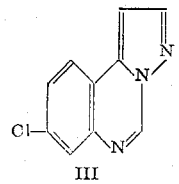

III

The benzo ring of the compounds of Formulas I, II, and III bears a chloro substituent in the 8-position. Said chloro substituent can be replaced by other substituents for the purposes of this invention. Moreover, the substituent is not limited to the 8-position, but can reside at any of the available positions of the benzo ring, i.e., 7, 8, 9 or 10. Examples of substituents which can replace the 8-chlorosubstituent illustrated in Formula I include nitro, lower-alkanesulfonyl, bromo, iodo, fluoro, trifluoromethyl, lower-alkoxy, lower-alkylthio, di-(lower-alkyl)amino and lower alkanoylamino.

The compounds of Formula I are prepared by reacting 3 - (2-amino - 4 - chlorophenyl)pyrazole having the formula

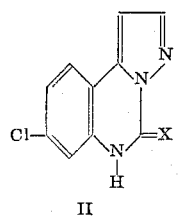

IV with an aldehyde, RCHO, for example formaldehyde (R=H), benzaldehyde (R=phenyl), 2-, 3-, or 4-pyridine aldehyde (R=pyridyl), 2- or 3-thiophene aldehyde (R=thienyl), 2- or 3-furaldehyde (R=furyl) and glyoxylic acid (R=carboxy). The preparation requires only that the reactants be heated in an inert solvent at about 50–150° C. for a short time. It is convenient, however, to reflux a solution of the reactants in a water-immiscible solvent under a water trap so that the progress of the reaction can be observed visually; that is, completion of the reaction is indicated when the theoretical quantity of water, the byproduct of the reaction, has collected in the water trap. Suitable solvents for the reaction form azeotropic mixtures with water and therefore remove the water as it is formed in the reaction. Examples of such solvents include benzene, toluene, xylene, dichloromethane, methyl isobutyl ketone, and the like. The time needed for completion of the reaction depends upon the boiling point of the particular solvent used, but the reaction time is ordinarily from one to two hours.

When the aldehydic reactant is glyoxylic acid, the reaction can be carried out either in an inert solvent to yield a 5-carboxy-5,6-dihydropyrazolo[1,5-c]quinazoline or in an alkanol, to yield the corresponding ester, i.e., a 5-carbalkoxy - 5,6 - dihydropyrazolo[1,5-c]quinazoline. Preferred alkanols for the latter reaction boil below 200° C. and include methanol, ethanol, propanol, isopropyl alcohol, butanol, sec-butyl alcohol, tert-butyl alcohol, isobutyl alcohol, pentanol, hexanol, heptanol, octanol, and the like, and lead to the corresponding methyl, ethyl, propyl, isopropyl, butyl, sec-butyl, tert-butyl, isobutyl, pentyl, hexyl, heptyl, octyl, and the like esters.

The compounds of Formula II are prepared by reacting 3-(2-amino-4-chlorophenyl)pyrazole (Formula IV) with phosgene (where X=O), or thiophosgene or carbon disulfide (where X=S). The reaction is conducted in an inert solvent in the presence of a strong base. When phosgene or thiophosgene is a reactant, the base employed neutralizes the hydrogen chloride formed in the reaction. When carbon disulfide is the reactant, only a small quantity of a base is used, and hydrogen sulfide is evolved from the reaction mixture. Suitable strong bases for this reaction include alkali, alkaline earth, and quaternary ammonium hydroxides.

The compound of Formula III is prepared by reacting 3-(2-amino-4-chlorophenyl)pyrazole (Formula IV) with an orthoformic ester, for example ethyl orthoformate. Although the reaction can be carried out in an inert solvent it is convenient and preferred to employ an excess of the ortho ester as a solvent. Thus when a solution of 3-(2-amino-4-chlorophenyl)pyrazole dissolved in excess ethyl orthoformate is refluxed for several hours, 8-chloropyrazole[1,5-c]quinazoline is obtained.

The free bases of Formulas I, II and III react with organic and inorganic acids to form acid-addition salts which are the full equivalents of the free base forms. Where the new pyrazolo[1,5-c]quinazolines contain several basic centers, they can form acid-addition salt forms with one or several molecular equivalents of the inorganic or organic acid.

The acid-addition salt forms of the basic amines and amides of the invention are conveniently obtained by interacting the free bases with the appropriate equivalent of an organic or inorganic acid. The acid moieties or anions in these salt forms are in themselves neither novel nor critical and therefore can be any anion of acid-like substance capable of salt formation with the free base form of the compound.

The compounds of Formulas I, II and III have been tested by standard pharmacological and bacteriological testing procedures and found to have hypotensive, psychomotor depressant and bacteriostatic activities.

The structures of the compounds of the invention were determined by infra-red spectral analysis, by their chemical properties, e.g., the formation of derivatives, and by the correspondence of calculated and found values of elemental analyses of representative samples.

The examples which follow illustrate the invention without limiting the latter thereto.

Example 1.—3-(2-amino-4-chlorophenyl)pyrazole

A mixture of 150 g. (0.76 mol) of 4,7-dichloroquinoline and 450 g. (9 mols) of 100% hydrazine hydrate was placed in an autoclave and heated at 150° with agitation for 5 hours. The mixture was allowed to cool and was poured into a large excess of ice water. The precipitate, consisting of crude 3-(2-amino-4-chlorophenyl)pyrazole was collected and was recrystallized from 10% aqueous ethanol. Recrystallized again from benzene, the pure 3-(2-amino-4-chlorophenyl)pyrazole, consisting of ten needles, melted at 115.8–117.2° C. (corr.).

Example 2.—3-(2-amino-6-chlorophenyl)pyrazole

Following the procedure given in Example 1, 40 g. of 4,5-dichloroquinoline was caused to react with 120 g. of 100% hydrazine hydrate in an autoclave. Recrystallized from isopropyl alcohol the pure 3-(2-amino-6-chlorophenyl)pyrazole thus obtained melted at 105.4–107.4° C. (corr.).

The hydrochloride acid-addition salt form melted at 232–236° C.

Example 3.—8-chloro-5-(4-chlorophenyl)-5,6-dihydropyrazolo[1,5-c]quinazoline

A solution containing 9.7 g. (0.05 mol) of 3-(2-amino-4-chlorophenyl)pyrazole and 9.5 g. (0.068 mol) of 4-chlorobenzaldehyde in 100 ml. of toluene was refluxed under a water trap for 2.5 hours. The solvent was removed under reduced pressure, and the resulting oil crystallized. Recrystallized from isopropyl alcohol the 8-chloro-5-(4-chlorophenyl) - 5,6 - dihydropyrazolo[1,5-c]-quinazoline thus obtained melted at 152.4–154.8° C. (corr.).

When 8-chloro - 5 - (4-chlorophenyl)-5,6-dihydropyrazolo[1,5-c]quinazoline was caused to react with a slight excess of nitrous acid (sodium nitrite in glacial acetic acid) there was obtained 8-chloro-5-(4-chlorophenyl)-5,6-dihydro-6-nitrosopyrazolo[1,5-c]quinazoline which, after recrystallization from isopropyl alcohol, melted with decomposition at 131.8–137.4° C. (corr.).

When 8-chloro - 5 - (4-chlorophenyl)-5,6-dihydropyrazolo[1,5-c]quinazoline was refluxed in excess acetyl chloride there was obtained 6-acetyl-8-chloro-5-(4-chlorophenyl)-5,6-dihydropyrazolo[1,5-c]quinazoline which, after recrystallization from ethyl acetate, melted at 231.6–233.8° C.

Example 4.—8 - chloro - 5 - (2 - hydroxyphenyl) - 5,6-dihydropyrazolo[1,5-c]quinazoline Following the procedure given in Example 3, 19.4 g. (0.1 mol) of 3-(2-amino-4-chlorophenyl)pyrazole was caused to react with 12.2 g. (0.1 mol) of salicylaldehyde dissolved in 150 ml. of methyl isobutyl ketone under a water separator. Recrystallized from isopropyl alcohol the 8 - chloro - 5 - (2 - hydroxyphenyl) - 5,6 - dihydropyrazolo[1,5-c]quinazoline thus prepared melted at 213.2–221.8° C. (corr.).

Example 5.—8 - chloro - 5 - (3 - pyridyl) - 5,6 - dihydropyrazolo[1,5-c]quinazoline Following the procedure given in Example 3, 3-(2-amino-4-chlorophenyl)pyrazole was caused to react with one molecular equivalent of 3-pyridine carboxaldehyde in methyl isobutyl ketone. Recrystallized from ethylene dichloride the 8-chloro-5-(3-pyridyl)-5,6-dihydropyrazolo[1,5-c]quinazoline thus prepared melted at 175.0–176.6° C. (corr.).

Example 6.—8 - chloro - 5,6 - dihydropyrazolo[1,5-c]quinazoline-5-carboxylic acid Following the procedure given in Example 3, 3-(2-amino-4-chlorophenyl)pyrazole was refluxed with one molecular equivalent of glyoxylic acid in methyl isobutyl ketone. The product, 8-chloro-5,6-dihydropyrazolo[1,5-c]quinazoline-5-carboxylic acid, crystallized from the reaction mixture and melted with decomposition at 188.6–189.6° C. (corr.).

Example 7.—5 - carbobutoxy - 8 - chloro - 5,6 - dihydropyrazolo[1,5-c]quinazoline When the reaction described in Example 6 was carried out by refluxing the reactants in n-butanol there was obtained 5 - carbobutoxy - 8 - chloro - 5,6 - dihydropyrazolo[1,5-c]quinazoline, which melted at 102.8–103.8° C. (corr.) after recrystallization from cyclohexane.

When the above reaction is conducted in methanol, there is obtained 5-carbomethoxy-8-chloro-5,6-dihydropyrazolo[1,5-c]quinazoline.

When the above reaction is conducted in tert-butyl alcohol, there is obtained 5-carbo-tert-butoxy-8-chloro-5,6-dihydropyrazolo[1,5-c]quinazoline.

When the above reaction is conducted in n-octanol, there is obtained 5-carboöctyloxy-8-chloro-5,6-dihydropyrazolo[1,5-c]quinazoline.

Example 8.—8-chloropyrazolo[1,5-c]quinazoline

Following the procedure given in Example 3, 9.7 g. of 3-(2-amino-4-chlorophenyl)pyrazole and 10 g. of ethyl orthoformate in 50 ml. of methyl isobutyl ketone were refluxed for 6 hours. When the resulting solution was cooled, the produce crystallized. Recrystallized from isopropyl alcohol, the 8-chloropyrazolo[1,5-c]quinazoline thus prepared melted at 161.2–162.8° C. (corr.).

Example 9.—8-chloropyrazolo[1,5-c]quinazolin-5(6H)-one 3-(2-amino-4-chlorophenyl)pyrazole (9.7 g.; 0.05 mol) was dissolved in 100 ml. of ethylene dichloride and to the solution was added 100 ml. of water. The resulting mixture was stirred thoroughly while phosgene gas was slowly introduced. The mixture was maintained basic by the periodic addition of 10% sodium hydroxide solution. During the course of the reaction, a light colored precipitate formed. After about 1 hour, the ethylene dichloride layer appeared to contain no more starting material, and the aqueous layer remained basic. The mixture was flushed thoroughly with nitrogen to remove excess phosgene, and the product was collected. Recrystallized from dimethylformamide, the 8-chloropyrazolo[1,5-c]quinazolin-5(6H)-one thus prepared melted above 300° C.

*Example 10.—8-chloropyrazolo[1,5-c]quinazolin-5(6H)-thione*

A solution containing 10 g. of 3-(2-amino-4-chlorophenyl)pyrazole, 10 g. of carbon disulfide and a catalytic quantity of trimethylbenzyl ammonium hydroxide in 100 ml. of benzene was refluxed for 7 hours, during which time the crude product precipitated. After the solution had cooled the precipitate was collected and recrystallized from 10% dimethylformamide in isopropyl alcohol. The resulting pure 8-chloropyrazolo[1,5-c]quinazolin-5(6H)-thione, consisting of white crystals, melted at 327–328.5° C.

*Example 11.—8-chloro-5,6-dihydropyrazolo[1,5-c]quinazoline*

Following the procedure given in Example 3, 9.7 g. (0.05 mol) of 3-(2-amino-4-chlorophenyl)pyrazole was refluxed with 3.0 g. (0.1 mol) of paraformaldehyde and two drops of concentrated hydrochloric acid in 150 ml. of benzene. The theoretical quantity of water was collected in the water separator in 1 hour. The solvent was removed under reduced pressure, yielding crude 8-chloro-5,6-dihydropyrazolo[1,5-c]quinazoline as a brown gum. The hydrochloride salt form, which was prepared by adding to the gum an excess of hydrogen chloride in ether, consisted of a nearly white powder which was very deliquescent and was not purified.

Following the manipulative procedure given in Example 1, the following substituted 3-(2-aminophenyl)pyrazole compounds are prepared using the indicated quinoline compound in place of 4,7-dichloroquinoline:

3-(2-amino-4-bromophenyl)pyrazole, from 7-bromo-4-chloroquinoline.
3-(2-amino-5-dimethylaminophenyl)pyrazole, from 4-chloro-6-dimethylaminoquinoline.
3-(2-amino-5-methoxyphenyl)pyrazole, from 4-chloro-6-methoxyquinoline.
3-(2-amino-4-hexyloxyphenyl)pyrazole, from 4-chloro-7-hexyloxyquinoline.
3-(2-amino-3-methoxyphenyl)pyrazole, from 4-chloro-8-methoxyquinoline.
3-(2-amino-5-nitrophenyl)pyrazole, from 4-chloro-6-nitroquinoline.
3-(5-acetamido-2-aminophenyl)pyrazole, from 6-acetamido-4-chloroquinoline.
3-(2-amino-5-fluorophenyl)pyrazole, from 4-chloro-6-fluoroquinoline.
3-(2-amino-4-iodophenyl)pyrazole, from 4-chloro-7-iodoquinoline.
3-(2-amino-3-nitrophenyl)pyrazole, from 4-chloro-8-nitroquinoline.
3-(2-amino-4-trifluoromethylphenyl)pyrazole, from 4-chloro-7-trifluoromethylquinoline.
3 - (2 - amino - 5 - methylthiophenyl)pyrazole, from 4-chloro-6-methylthioquinoline.

Following the manipulative procedure given in Example 3, the following compounds are prepared from the indicated pyrazole compound and benzaldehyde:

8-bromo-5-phenyl-5,6-dihydropyrazolo[1,5-c]quinazoline, from 3-(2-amino-4-bromophenyl)pyrazole.
9-dimethylamino-5-phenyl-5,6-dihydropyrazolo[1,5-c]quinazoline, from 3-(2-amino-5-dimethylaminophenyl)pyrazole.
9-methoxy-5-phenyl-5,6-dihydropyrazolo[1,5-c]quinazoline, from 3-(2-amino-5-methoxyphenyl)pyrazole.
8-hexyloxy-5-phenyl-5,6-dihydropyrazolo[1,5-c]quinazoline, from 3-(2-amino-4-hexyloxyphenyl)pyrazole.
7-methoxy-5-phenyl-5,6-dihydropyrazolo[1,5-c]quinazoline, from 3-(2-amino-3-methoxyphenyl)pyrazole.
9-nitro-5-phenyl-5,6-dihydropyrazolo[1,5-c]quinazoline, from 3-(2-amino-5-nitrophenyl)pyrazole.
9-acetamido-5-phenyl-5,6-dihydropyrazolo[1,5-c]quinazoline, from 3-(5-acetamido-2-aminophenyl)pyrazole.
9-fluoro-5-phenyl-5,6-dihydropyrazolo[1,5-c]quinazoline, from 3-(2-amino-5-fluorophenyl)pyrazole.
8-iodo-5-phenyl-5,6-dihydropyrazolo[1,5-c]quinazoline, from 3-(2-amino-5-iodophenyl)pyrazole.
7-nitro-5-phenyl-5,6-dihydropyrazolo[1,5-c]quinazoline, from 3-(2-amino-3-nitrophenyl)pyrazole.
5-phenyl-8-trifluoromethyl-5,6-dihydropyrazolo[1,5-c]quinazoline, from 3-(2-amino-4-trifluoromethylphenyl)pyrazole.
9-methylthio-5-phenyl-5,6-dihydropyrazolo[1,5-c]quinazoline, from 3-(2-amino-5-methylthiophenyl)pyrazole.

Following the manipulative procedure given in Example 3, the following 8-chloro-5,6-dihydropyrazolo[1,5-c]quinazolines are prepared using the indicated aldehyde in place of 4-chlorobenzaldehyde:

8-chloro-5-(4-methoxyphenyl)-5,6-dihydropyrazolo[1,5-c]quinazoline, from anisaldehyde.
8-chloro-5-(4-dimethylaminophenyl)-5,6-dihydropyrazolo[1,5-c]quinazoline, from 4-dimethylaminobenzaldehyde.
8-chloro-5-phenyl-5,6-dihydropyrazolo[1,5-c]quinazoline, from benzaldehyde.
8-chloro-5-(3-nitrophenyl)-5,6-dihydropyrazolo[1,5-c]quinazoline, from 3-nitrobenzaldehyde.
8-chloro-5-(3,4-dihydroxyphenyl)-5,6-dihydropyrazolo[1,5-c]quinazoline, from 3,4-dihydroxybenzaldehyde.
8-chloro-5-(4-diethylaminophenyl)-5,6-dihydropyrazolo[1,5-c]quinazoline, from 4-dimethylaminobenzaldehyde.
8-chloro-5-(3-ethoxy-4-hydroxyphenyl)-5,6-dihydropyrazolo[1,5-c]quinazoline, from 4-dimethylaminobenzaldehyde.
8-chloro-5-(3-ethoxy-4-hydroxyphenyl)-5,6-dihydropyrazolo[1,5-c]quinazoline, from 3-ethoxy-4-hydroxybenzaldehyde.
8-chloro-5-(5-chloro-2-hydroxyphenyl)-5,6-dihydropyrazolo[1,5-c]quinazoline, from 5-chlorosalicylaldehyde.
8-chloro-5-(2,4-dichlorophenyl)-5,6-dihydropyrazolo[1,5-c]quinazoline, from 2,4-dichlorobenzaldehyde.
8-chloro-5-(5-bromo-2-hydroxyphenyl)-5,6-dihydropyrazolo[1,5-c]quinazoline, from 5-bromosalicylaldehyde.
8-chloro-5-(2-furyl)-5,6-dihydropyrazolo[1,5-c]quinazoline, from 2-furaldehyde.
8-chloro-5-(2,4,6-trinitrophenyl)-5,6-dihydropyrazolo[1,5-c]quinazoline, from 2,4,6-trinitrobenzaldehyde.
8-chloro-5-(3,4,5-trimethoxyphenyl)-5,6-dihydropyrazolo[1,5-c]quinazoline, from 3,4,5-trimethoxybenzaldehyde.
8-chloro-5-(2-thienyl)-5,6-dihydropyrazolo[1,5-c]quinazoline, from 2-thiophenecarboxaldehyde.
8-chloro-5-(5-nitrofuryl)-5,6-dihydropyrazolo[1,5-c]quinazoline, from 5-nitrofurfural.
8-chloro-5-(4-pyridyl)-5,6-dihydropyrazolo[1,5-c]quinazoline, from 4-pyridinecarboxaldehyde.
8-chloro-5-(4-tolyl)-5,6-dihydropyrazolo[1,5-c]quinazoline, from 4-tolualdehyde.
8-chloro-5-(2,3,6-trimethylphenyl)-5,6-dihydropyrazolo[1,5-c]quinazoline, from 2,3,6-trimethylbenzaldehyde.
8-chloro-5-(4-sec-butylphenyl)-5,6-dihydropyrazolo[1,5-c]quinazoline, from 4-sec-butylbenzaldehyde.
8-chloro-5-(5-methylfuryl)-5,6-dihydropyrazolo[1,5-c]quinazoline, from 5-methylfurfural.
8-chloro-5-(3-methyl-2-thienyl)-5,6-dihydropyrazolo[1, 5-c]quinazoline, from 3-methyl-2-thiophenecarboxaldehyde.

8-chloro-5-(3-thienyl)-5,6-dihydropyrazolo[1,5-c]quinazoline, from 3-thiophenecarboxaldehyde.

8-chloro-5-(2-fluorophenyl)-5,6-dihydropyrazolo[1,5-c]quinazoline, from 2-fluorobenzaldehyde.

8-chloro-5-(4-iodophenyl)-5,6-dihydropyrazolo[1,5-c]quinazoline, from 4-iodobenzaldehyde.

8-chloro-5-(4-trifluoromethylphenyl)-5,6-dihydropyrazolo[1,5-c]quinazoline, from 4-trifluoromethylbenzaldehyde.

8-chloro-5-(2-mercaptophenyl)-5,6-dihydropyrazolo[1,5-c]quinazoline, from 2-mercaptobenzaldehyde.

8-chloro-5-(2-methylmercaptophenyl)-5,6-dihydropyrazolo[1,5-c]quinazoline, from 2-methylmercaptobenzaldehyde.

8-chloro-5-(4-methanesulfonylphenyl)-5,6-dihydropyrazolo[1,5-c]quinazoline, from 4-methanesulfonylbenzaldehyde.

8-chloro-5-(4-carboxyphenyl)-5,6-dihydropyrazolo[1,5-c]quinazoline, from terephthalaldehydic acid.

We claim:

1. A compound of the formula

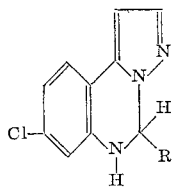

wherein R is a member of the group consisting of H, phenyl, pyridyl, thienyl, furyl, carboxy and COOR', wherein R' is alkyl of from one to ten carbon atoms.

2. 8 - chloro - 5 - (4 - chlorophenyl)-5,6-dihydropyrazolo[1,5-c]quinazoline.

3. 8 - chloro - 5 - (2 - hydroxyphenyl) - 5,6 - dihydropyrazolo[1,5-c]quinazoline.

4. 8 - chloro - 5 - (3 - pyridyl) - 5,6 - dihydropyrazolo[1,5-c]quinazoline.

5. 8 - chloro - 5,6 - dihydropyrazolo[1,5-c]quinazoline-5-carboxylic acid.

6. 5 - carbobutoxy - 8 - chloro-5,6-dihydropyrazolo[1,5-c]-quinazoline.

7. A compound of the formula

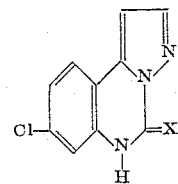

wherein X is a member of the group consisting of O and S.

8. 8-chloropyrazolo[1,5-c]quinazolin-5(6H)-one.

9. 8-chloropyrazolo[1,5-c]quinazolin-5(6H)-thione.

10. 8-chloro-5,6-dihydropyrazolo[1,5-c]quinazoline.

11. The process for preparing 8-chloropyrazolo[1,5-c]quinazolin-5(6H)-one which comprises reacting 3-(2-amino-4-chlorophenyl)pyrazole with phosgene in the presence of a strong base.

12. The process for preparing 8-chloropyrazolo[1,5-c]quinazolin-5-(6H)thione which comprises reacting 3-(2-amino-4-chlorophenyl)pyrazole with carbon disulfide in the presence of a strong base.

13. A compound of the formula

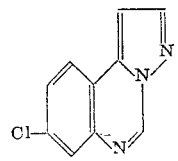

14. 8 - chloro-5-(4-chlorophenyl)-5,6-dihydro-6-acetylpyrazolo[1,5-c]quinazoline.

15. 8 - chloro-5-(4-chlorophenyl)-5,6-dihydro-6-nitrosopyrazolo[1,5-c]quinazoline.

References Cited by the Examiner

UNITED STATES PATENTS 2,963,480  12/1960  Taylor et al. _____ 260—256.4

OTHER REFERENCES

De Stevens et al.: Angew. Chem., vol. 74, p. 249 (1962).

De Stevens et al.: Jour. Org. Chem., vol. 28, pp. 1336–1339 (May 1963).

ALEX MAZEL, *Primary Examiner.*

NICHOLAS S. RIZZO, HENRY R. JILES, *Examiners.*

MARY U. O'BRIEN, *Assistant Examiner.*

UNITED STATES PATENT OFFICE
CERTIFICATE OF CORRECTION

Patent No. 3,313,815                            April 11, 1967

Roger T. Wolfe et al.

It is hereby certified that error appears in the above numbered patent requiring correction and that the said Letters Patent should read as corrected below.

Column 3, line 52, for "ten" read -- tan --; column 4, line 67, for "produce" read -- product --; column 6, lines 41 to 43, strike out "8-chloro-5-(3-ethoxy-4-hydroxyphenyl)-5,6-dihydropyrazolo[1,5-c]quinazoline, from 4-dimethylaminobenzaldehyde.".

Signed and sealed this 22nd day of October 1968.

(SEAL)
Attest:

Edward M. Fletcher, Jr.                        EDWARD J. BRENNER
Attesting Officer                             Commissioner of Patents